US009328273B2

(12) United States Patent
Imai et al.

(10) Patent No.: US 9,328,273 B2
(45) Date of Patent: May 3, 2016

(54) LAMINATING ADHESIVE AND LAMINATE

(71) Applicant: MITSUI CHEMICALS, INC., Tokyo (JP)

(72) Inventors: Akihiro Imai, Chiba (JP); Takashi Uchida, Chiba (JP); Hoang Yen Dinh, Ichihara (JP); Shirou Honma, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/376,256

(22) PCT Filed: Jan. 18, 2013

(86) PCT No.: PCT/JP2013/050913
§ 371 (c)(1),
(2) Date: Aug. 1, 2014

(87) PCT Pub. No.: WO2013/118562
PCT Pub. Date: Aug. 15, 2013

(65) Prior Publication Data
US 2015/0005430 A1    Jan. 1, 2015

(30) Foreign Application Priority Data

Feb. 10, 2012 (JP) ................. 2012-027554

(51) Int. Cl.
| | | |
|---|---|---|
| C08L 75/04 | (2006.01) |
| C09J 11/04 | (2006.01) |
| C09J 175/04 | (2006.01) |
| C08K 3/34 | (2006.01) |
| C09J 11/06 | (2006.01) |
| C09J 201/06 | (2006.01) |
| B32B 7/12 | (2006.01) |
| B32B 27/08 | (2006.01) |
| B32B 27/32 | (2006.01) |
| C08G 18/70 | (2006.01) |
| C08G 18/72 | (2006.01) |
| C08G 18/73 | (2006.01) |
| C08G 18/75 | (2006.01) |
| C08G 18/08 | (2006.01) |
| C08G 18/12 | (2006.01) |
| C08G 18/28 | (2006.01) |
| C08G 18/44 | (2006.01) |

(52) U.S. Cl.
CPC ............. *C09J 175/04* (2013.01); *B32B 7/12* (2013.01); *B32B 27/08* (2013.01); *B32B 27/32* (2013.01); *C08G 18/0823* (2013.01); *C08G 18/12* (2013.01); *C08G 18/283* (2013.01); *C08G 18/44* (2013.01); *C08G 18/706* (2013.01); *C08G 18/724* (2013.01); *C08G 18/73* (2013.01); *C08G 18/757* (2013.01); *C09J 11/04* (2013.01); *C09J 11/06* (2013.01); *C09J 201/06* (2013.01); *B32B 2250/02* (2013.01); *B32B 2250/242* (2013.01); *B32B 2255/10* (2013.01); *B32B 2255/26* (2013.01); *B32B 2307/412* (2013.01); *B32B 2307/518* (2013.01); *B32B 2307/7244* (2013.01); *B32B 2307/7246* (2013.01); *B32B 2553/00* (2013.01); *C08G 2170/80* (2013.01); *C09J 2475/00* (2013.01)

(58) Field of Classification Search
CPC ...... C09J 175/04; C09J 175/10; C08K 3/346; C08G 18/12; C08L 75/04
See application file for complete search history.

(56) References Cited

U.S. PATENT DOCUMENTS

| | | | |
|---|---|---|---|
| 6,426,414 B1 * | 7/2002 | Laas | .................... C08G 18/222 252/182.2 |
| 6,482,523 B1 * | 11/2002 | Morikawa et al. | ......... 428/423.1 |
| 6,569,533 B1 | 5/2003 | Uchida et al. | |
| 6,979,493 B2 * | 12/2005 | Uchida et al. | .............. 428/423.1 |
| 2003/0229194 A1 * | 12/2003 | Nomura | ................. C08G 18/10 528/59 |
| 2005/0084686 A1 | 4/2005 | Imaizumi | |
| 2007/0031679 A1 | 2/2007 | Ushida et al. | |
| 2010/0119821 A1 | 5/2010 | Uemura et al. | |
| 2012/0016075 A1 * | 1/2012 | Uchida | ......................... 524/591 |

FOREIGN PATENT DOCUMENTS

| | | |
|---|---|---|
| JP | 06-80948 | 3/1994 |
| JP | 11-323300 | 11/1999 |
| JP | 2001-098047 | 4/2001 |
| JP | 2002-194319 | 7/2002 |
| JP | 2003326662 A * | 11/2003 |
| JP | 2004-026880 | 1/2004 |
| JP | 2005-047209 | 2/2005 |
| JP | 2005-138581 | 6/2005 |
| JP | 2005-139436 | 6/2005 |
| JP | 2006-193657 | 7/2006 |
| JP | 2008-303274 | 12/2008 |
| JP | 2009-035605 | 2/2009 |

OTHER PUBLICATIONS

Machine translated English equivalent of JP 2003-326662 (Nov. 2003, 10 pages).*
English language translation of JP 2003-326662 (Nov. 2003, 40 pages).*
International Search Report dated Apr. 9, 2013, Application No. PCT/JP2013/050913.

* cited by examiner

*Primary Examiner* — Brieann R Fink
(74) *Attorney, Agent, or Firm* — Rankin, Hill & Clark LLP

(57) ABSTRACT

A laminating adhesive is prepared from a water-borne resin obtained by allowing an isocyanate group-terminated prepolymer having an anionic group to react with a chain extender; a swellable inorganic layer compound; and a water dispersible polyisocyanate curing agent.

4 Claims, No Drawings

LAMINATING ADHESIVE AND LAMINATE

TECHNICAL FIELD

The present invention relates to a laminating adhesive and a laminate. To be specific, the present invention relates to a laminating adhesive suitably used for producing a laminate such as a composite film; and to a laminate.

BACKGROUND ART

Composite films in which various films are bonded with a laminating adhesive are widely used in various industrial fields.

In particular, a composite film in which, for example, a plastic film, and a metal foil or a metal deposited film are bonded with a laminating adhesive is excellent in light shading properties and gas and liquid barrier properties; and is widely used as various materials that require such barrier properties.

As laminating adhesives for adhesion of composite films, a two-component curable adhesive composed of a polyisocyanate component and a polyol component is widely known.

Recently, in view of reduction in environmental burden and improvement in working environment, development of solventless laminating adhesives containing no organic solvent but containing a polyisocyanate component and a polyol component has been examined (for example, see Patent Document 1 below).

Furthermore, using the above-described solventless laminating adhesive, for example, a composite film excellent in barrier properties can be produced by laminating a plastic film such as a polyethylene terephthalate (PET) film to an aluminum vapor deposited film.

CITATION LIST

Patent Document

Patent Document 1
Japanese Unexamined Patent Publication No. 2008-303274

SUMMARY OF INVENTION

Problem to be Solved by the Invention

However, to provide barrier properties to a composite film using a laminating adhesive such as the one described above, a barrier layer such as a metal foil or a metal deposited film is necessary, and therefore it is disadvantageous in that, for example, physical properties, layer structure, and appearance of the composite film are restricted by the barrier layer.

An object of the present invention is to provide a laminating adhesive that can ensure excellent barrier properties; and a laminate.

Means for Solving the Problem

A laminating adhesive of the present invention is prepared from a water-borne resin obtained by allowing an isocyanate group-terminated prepolymer having an anionic group to react with a chain extender; a swellable inorganic layer compound; and a water dispersible polyisocyanate curing agent.

In the laminating adhesive of the present invention, it is preferable that 100 to 500 parts by mass of the water dispersible polyisocyanate curing agent is blended relative to 100 parts by mass of the swellable inorganic layer compound.

In the laminating adhesive of the present invention, it is preferable that the isocyanate group-terminated prepolymer is obtained by allowing a polyisocyanate of at least one selected from the group consisting of an aromatic polyisocyanate, an aralkyl polyisocyanate, and an alicyclic polyisocyanate to react with a polyol having 2 to 8 carbon atoms and an anionic group-containing polyol having 3 to 6 carbon atoms.

In the laminating adhesive of the present invention, it is preferable that the water dispersible polyisocyanate curing agent contains an aliphatic polyisocyanate and/or an alicyclic polyisocyanate.

In the laminating adhesive of the present invention, it is preferable that the water dispersible polyisocyanate curing agent contains an aliphatic polyisocyanate and an alicyclic polyisocyanate.

A laminate of the present invention is obtained by using the above-described laminating adhesive.

Effects of the Invention

A laminating adhesive of the present invention is prepared from a water-borne resin obtained by allowing an isocyanate group-terminated prepolymer having an anionic group to react with a chain extender; a swellable inorganic layer compound; and a water dispersible polyisocyanate curing agent. Therefore, the laminating adhesive of the present invention is excellent in barrier properties.

Therefore, a laminate of the present invention obtained by using a laminating adhesive of the present invention has excellent barrier properties.

Embodiment of the Invention

A laminating adhesive of the present invention is prepared from a water-borne resin, a swellable inorganic layer compound, and a water dispersible polyisocyanate curing agent.

The water-borne resin is obtained by allowing an isocyanate group-terminated prepolymer having an anionic group to react with a chain extender.

The isocyanate group-terminated prepolymer is obtained by allowing, for example, a polyisocyanate, a polyol, and an anionic group-containing polyol.

Examples of polyisocyanates include aromatic polyisocyanates, aralkyl polyisocyanates, alicyclic polyisocyanates, and aliphatic polyisocyanates.

Examples of aromatic polyisocyanates include aromatic diisocyanates such as 4,4'-, 2,4'- or 2,2'-diphenylmethane diisocyanate or their mixtures (MDI), 2,4- or 2,6-tolylene diisocyanate or their mixtures (TDI), 4,4'-toluidinediisocyanate (TODI), 1,5-naphthalene diisocyanate (NDI), m- or p-phenylene diisocyanate or their mixtures, 4,4'-diphenyl diisocyanate, and 4,4'-diphenylether diisocyanate.

Examples of aralkyl polyisocyanates include aralkyl diisocyanates such as 1,3- or 1,4-xylylene diisocyanate or their mixtures (XDI), 1,3- or 1,4-tetramethylxylylene diisocyanate or their mixtures (TMXDI), and ω,ω'-diisocyanate-1,4-diethylbenzene.

Examples of alicyclic polyisocyanates include alicyclic diisocyanates such as 3-isocyanatomethyl-3,5,5-trimethylcyclohexyl isocyanate (isophorone diisocyanate, IPDI), 4,4'-, 2,4'- or 2,2'-dicyclohexylmethane diisocyanate or their mixtures ($H_{12}$MDI), 1,3- or 1,4-bis(isocyanatomethyl)cyclohexane or their mixtures ($H_6$XDI), bis(isocyanatomethyl)norbornane (NBDI), 1,3-cyclopentene diisocyanate, 1,4-cyclohexane diisocyanate, 1,3-cyclohexane diisocyanate, methyl-2,4-cyclohexane diisocyanate, and methyl-2,6-cyclohexane diisocyanate.

Examples of aliphatic polyisocyanates include aliphatic diisocyanates such as hexamethylene diisocyanate (HDI), pentamethylene diisocyanate (PDI), tetramethylene diisocyanate, trimethylene diisocyanate, 1,2-, 2,3- or 1,3-butylene diisocyanate, and 2,4,4- or 2,2,4-trimethylhexamethylene diisocyanate.

Examples of polyisocyanates include polyisocyanate derivatives, for example, multimers of the above-described polyisocyanates (for example, dimers, trimers (for example, isocyanurate-modified polyisocyanates, iminooxadiazinedione-modified polyisocyanates), pentamers, and septamers), allophanate-modified polyisocyanates (for example, an allophanate-modified polyisocyanates produced by reaction of the above-described polyisocyanate with a low molecular-weight polyol), polyol-modified polyisocyanates (for example, polyol-modified polyisocyanates (alcohol adduct) produced by reaction of polyisocyanate with a low molecular-weight polyol), biuret-modified polyisocyanates (for example, a biuret-modified polyisocyanates produced by reaction of the above-described polyisocyanate with water, or amines), urea-modified polyisocyanates (for example, urea-modified polyisocyanates produced by reaction of the above-described polyisocyanate with diamine), an oxadiazinetrione-modified polyisocyanates (for example, oxadiazinetrione produced by reaction of the above-described polyisocyanate with carbon dioxide), carbodiimide-modified polyisocyanates (carbodiimide-modified polyisocyanates produced by decarboxylation condensation reaction of the above-described polyisocyanate), uretdione-modified polyisocyanates, and uretonimine-modified polyisocyanates.

These examples of polyisocyanate can be used singly, or can be used in combination of two or more, and in view of barrier properties, preferably, at least one polyisocyanate selected from the group consisting of an aromatic polyisocyanate, an aralkyl polyisocyanate, and an alicyclic polyisocyanate is used. Even more preferably, XDI and $H_6XDI$ are used.

Examples of polyols include a low molecular-weight compound having two or more hydroxyl groups and a molecular weight of 60 to 400, and in view of barrier properties, the following are used: diols such as ethylene glycol, propanediol, 1,4-butyleneglycol, 1,3-butyleneglycol, 1,2-butyleneglycol, 1,6-hexanediol, neopentyl glycol, alkane(C7 to C22)diol, diethylene glycol, triethylene glycol, dipropylene glycol, cyclohexanedimethanol, alkane-1,2-diol(C17 to C20), hydrogenated bisphenol A, 1,4-dihydroxy-2-butene, 2,6-dimethyl-1-octene-3,8-diol, bishydroxyethoxybenzene, xyleneglycol, and bishydroxyethyleneterephthalate; triols such as glycerin, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol, and other aliphatic triols (C8 to 24); and polyols having four or more hydroxyl groups such as tetramethylolmethane, D-sorbitol, xylitol, D-mannitol, and D-mannite.

These polyols can be used singly, or can be used in combination of two or more. Preferably, a polyol having 2 to 8 carbon atoms, even more preferably, a diol having 2 to 8 carbon atoms, and triol having 2 to 8 carbon atoms are used, and particularly preferably, a combination of these diols and triols is used. When the number of carbons in the polyol is outside the above-described range, barrier properties may be reduced.

The anionic group-containing polyol is a polyol having an anionic group such as a carboxyl group, a sulfonic acid group, a phosphoric acid group, and a betaine structure-containing group such as a sulfobetaine. Preferably, a carboxyl group-containing polyol is used.

Examples of carboxyl group-containing polyols include dihydroxyalkane-carboxylic acid having 2 to 10 carbon atoms such as dimethylolacetic acid, dimethylol propionic acid, dimethylolbutanoic acid, and 2,2-dimethylolhexanoic acid; dihydroxyalkane-polycarboxylic acid having 4 to 10 carbon atoms or dihydroxyalkene-polycarboxylic acid having 4 to 10 carbon atoms such as dioxymaleic acid; and dihydroxyarene-carboxylic acid having 6 to 10 carbon atoms such as 2,6-dihydroxybenzoic acid.

These anionic group-containing polyols can be used singly, or can be used in combination of two or more. Preferably, dihydroxyalkane-carboxylic acid having 2 to 10 carbon atoms is used. Even more preferably, dihydroxyalkane-carboxylic acid having 3 to 6 carbon atoms is used.

To produce an isocyanate group-terminated prepolymer, polyisocyanate is blended with polyol and an anionic group-containing polyol, for example, at a ratio such that the isocyanate group of the polyisocyanate is in excess relative to the hydroxyl group in total of the polyol and anionic group-containing polyol, to be more specific, a ratio such that the equivalent ratio (isocyanate group/hydroxyl group) of the isocyanate group relative to the hydroxyl group is more than 1, preferably, at a ratio of 1.1 to 10; and the mixture is allowed to react by a known polymerization method such as solution polymerization or bulk polymerization.

In the solution polymerization, polyisocyanate, polyol, and anionic group-containing polyol are added to an organic solvent, and the mixture is allowed to react at a reaction temperature of 20 to 90° C. for 1 to several hours. Examples of organic solvents include those solvents that are inactive to isocyanate groups, excellently hydrophilic, and have a low boiling point, which allows for easy removal, such as esters including ethyl acetate and butyl acetate; ketones including acetone and methyl ethyl ketone; ethers including such as tetrahydrofuran; and nitriles including acetinitrile.

In bulk polymerization, for example, polyisocyanate is stirred under nitrogen gas stream, and a polyol and an anionic group-containing polyol are added thereto, and the mixture is allowed to react at a reaction temperature of 60 to 90° C. for 1 to several hours.

In the present invention, a solution polymerization is preferably used, because adjustment of reactivity and viscosity are easier.

In the above-described reaction, as necessary, a known urethanization catalyst such as, for example, amine, tin, or lead urethanization catalyst may be used, and the unreacted monomer of polyisocyanate can be removed from the obtained isocyanate group-terminated prepolymer by, for example, a known removal methods such as distillation and extraction.

Furthermore, in the reaction, the mixing ratio of the anionic group-containing polyol to the polyol is such that 3 to 500 parts by mass, preferably 10 to 120 parts by mass of the anionic group-containing polyol is blended relative to 100 parts by mass of the polyol, and the anionic group-containing polyol is blended per 100 g of the water-borne resin so that the anionic group is generally 10 to 200 milli-equivalent, preferably 15 to 100 milli-equivalent. When the anionic group equivalent is within such a range, excellent dispersiveness can be ensured.

The thus obtained isocyanate group-terminated prepolymer is a polyurethane prepolymer having a free isocyanate group at its molecular end(s), and has an isocyanate group content of, for example, 2 to 25 mass %, preferably 5 to 20 mass %. The isocyanate group has an average functional group number of, for example, 2 to 5, preferably 2 to 3.5.

Then, to produce a water-borne resin, the obtained isocyanate group-terminated prepolymer is neutralized, and water-dispersed, and thereafter, is allowed to react with a chain extender. Alternatively, the obtained isocyanate group-terminated prepolymer is neutralized and allowed to react with a chain extender, and thereafter water-dispersed. Preferably, after the obtained isocyanate group-terminated prepolymer is neutralized and water-dispersed, the obtained isocyanate group-terminated prepolymer is allowed to react with the chain extender.

Examples of the neutralizing agent used in the neutralization include tertiary amines such as trimethylamine, triethylamine, tri-n-propylamine, tributylamine, triethanol amine, dimethylethanolamine, and triisopropanolamine; alkali metalhydroxide such as potassium hydroxide, sodium hydroxide, and lithium hydroxide; and ammonia.

For the chain extender, for example, a polyamine having two or more amino groups may be used. Examples of such polyamines include ethylene diamine, 1,3-propane diamine, 1,4-butanediamine, 1,6-hexamethylenediamine, 1,4-cyclohexanediamine, 3-aminomethyl-3,5,5-trimethylcyclohexylamine, piperazine, 2,5-dimethylpiperazine, isophoronediamine, 4,4'-cyclohexylmethanediamine, norbornanediamine, hydrazine and hydrazine derivatives, diethylene triamine, triethylenetriamine, 1,3- or 1,4-bis(aminomethyl)cyclohexane or their mixtures, and xylylenediamine.

The polyamine may have a hydroxyl group, and examples of such a polyamine having a hydroxyl group include amino C2-6 alkylamino C2-3 alkylalcohol such as 2-[(2'-aminoethyl)amino]ethanol (also called: 2-hydroxyethylaminoethylamine), 2-aminoethylaminopropanol, 2-(3'-aminopropyl) aminoethanol, and 3-(2'-hydroxyethyl)aminopropylamine.

To react the isocyanate group-terminated prepolymer with the chain extender, preferably, first, a neutralizing agent is added to the obtained isocyanate group-terminated prepolymer for neutralization so that the anionic group forms a salt. The neutralizing agent is added so that its 1 anionic group equivalent is, for example, 0.4 to 1.2, preferably 0.6 to 1.00.

Thereafter, water is added to the isocyanate group-terminated prepolymer to disperse the isocyanate group-terminated prepolymer, and then a chain extender is blended to the mixture such that the equivalent ratio (to be specific, amino group/isocyanate group) of the active hydrogen group relative to the isocyanate group is, for example, 0.05 to 1.1, preferably 0.1 to 1.0. Then, after the blending, the mixture is allowed to react, for example, at 5 to 30° C. for 0.5 to several hours. In this manner, the isocyanate group-terminated prepolymer is chain-extended with the chain extender, and an aqueous dispersion in which a water-borne resin is dispersed in water can be obtained.

After the termination of the reaction, when the organic solvent remains, for example, in the case when the isocyanate group-terminated prepolymer is synthesized by solution polymerization, the organic solvent is removed, for example, by heating at a suitable temperature under reduced pressure.

The thus obtained water-borne resin is a water dispersible (self-emulsification type) polyurethane resin having an anionic group in one molecular chain, and has an acid value of, for example, 5 to 50 mgKOH/g, preferably 10 to 40 mgKOH/g.

When the water-borne resin has an acid value within the above-described range, stable aqueous form can be achieved with excellent water dispersibility and, crosslinking reaction that is excellent in coating-forming properties and effective can be caused.

The ratio of the water-borne resin relative to the aqueous dispersion is, that is, the solid content of the aqueous dispersion is, for example, 5 to 60 mass %, preferably 10 to 50 mass %. The solid content of the aqueous dispersion can be adjusted with the amount of water added.

The average particle size of the water-borne resin in the aqueous dispersion is, for example, 20 to 400 nm, preferably 40 to 200 nm. The average particle size is an average particle size determined by dynamic light scattering method.

The swellable inorganic layer compound is composed of very thin unit crystals, and is clay mineral having such characteristics that solvents are coordinated or absorbed/swelled between unit crystal layers. Examples of swellable inorganic layer compounds include hydrated silicates (phyllosilicate minerals, etc.), kaolinite group clay minerals (halloysite, kaolinite, endellite, dickite, nakhlite, etc.), antigorite group clay minerals (antigorite, chrysotile, etc.), smectite group clay minerals (montmorillonite, beidellite, nontronite, saponite, hectorite, sauconite, stevensite, etc.), vermiculite group clay minerals (vermiculite, etc.), mica group clay minerals (micas such as muscovite, and phlogopite, margarite, tetra silicic mica, taeniolite, etc.), and synthetic mica.

The average particle size (laser diffraction analyzer) of the swellable inorganic layer compound is generally 15 μm or less, for example, 50 nm to 15 μm, preferably 100 nm to 15 μm. The swellable inorganic layer compound has an aspect ratio of, for example, 50 to 5000, preferably 100 to 3000, even more preferably 200 to 2500.

These swellable inorganic layer compounds may be natural clay minerals, or may be synthetic clay minerals. The swellable inorganic layer compounds can be used singly, or can be used in combination of two or more. Preferably, smectite group clay minerals (montmorillonite, etc.), mica group clay minerals (water-swelling mica, etc.), and synthetic micas are used.

The mixing ratio of the swellable inorganic layer compound relative to 100 parts by mass of the water-borne resin (solid content of aqueous dispersion) is, for example, 0.1 to 200 parts by mass, preferably 1 to 150 parts by mass, and the mixing ratio of the swellable inorganic layer compound relative to 100 parts by mass of the solid content of the laminating adhesive is, for example, 0.1 to 150 parts by mass, preferably 1 to 100 parts by mass.

Examples of the water dispersible polyisocyanate curing agent include those polyisocyanates dispersed with an external emulsifier, and those polyisocyanates partially containing a hydrophilic group, and preferably, those polyisocyanates partially containing a hydrophilic group are used.

Examples of the polyisocyanate in the water dispersible polyisocyanate curing agent include a polyisocyanate having two or more isocyanate groups, to be specific, for example, triisocyanate compounds, for example, the above-described polyisocyanate derivatives (trimers and/or allophanate-modified polyisocyanate, etc.).

For the polyisocyanate, preferably, an aliphatic polyisocyanate, an alicyclic polyisocyanate, their derivatives, and mixtures thereof are used.

When aliphatic/alicyclic polyisocyanates and/or their derivatives are used (that is, when the water dispersible polyisocyanate curing agent contains aliphatic/alicyclic polyisocyanate), laminate strength as an excellent laminate can be ensured.

For the polyisocyanate, preferably, a combination of an aliphatic polyisocyanate and/or its derivative and an alicyclic polyisocyanate and/or its derivative is used.

When an aliphatic polyisocyanate and/or its derivative and an alicyclic polyisocyanate and/or its derivative are used in combination, ratios of their content relative to 100 parts by mass of alicyclic polyisocyanate and/or its derivative are as follows: 50 parts by mass or more, preferably 150 parts by mass or more, more preferably 250 parts by mass or more, and for example, 600 parts by mass or less, preferably 500 parts by mass or less, more preferably, 400 parts by mass or less of the aliphatic polyisocyanate and/or its derivative.

When the aliphatic polyisocyanate and/or its derivative and the alicyclic polyisocyanate and/or its derivative are used in combination in the above-described content ratio, laminate strength and barrier properties of the laminate can be improved.

Examples of hydrophilic groups include anion groups (carboxylic acid group, sulfonic acid group, etc.) and non-ionic groups (polyoxyethylene glycol group), and preferably, non-ionic groups are used.

Examples of the polyisocyanate partially containing a non-ionic group include, to be specific, for example, a compound having two or more isocyanate groups at its molecular end(s), and a polyoxyethylene chain (hereinafter referred to as polyoxyethylene chain-containing polyisocyanate).

The polyoxyethylene chain-containing polyisocyanate can be obtained by, for example, subjecting a polyisocyanate having two or more isocyanate groups and a one-end capped polyoxyethylene glycol (alkoxy ethylene glycol with one end capped with C1 to 20 alkyl group) to urethane reaction at a ratio such that the isocyanate group of the polyisocyanate is in excess relative to the hydroxyl group of the one-end capped polyoxyethylene glycol, and as necessary, removing unreacted polyisocyanate.

In preparation of the polyoxyethylene chain-containing polyisocyanate, for the one-end capped polyoxyethylene glycol, preferably, methoxypolyethylene glycol is used.

The polyoxyethylene chain-containing polyisocyanate contains, for example, 5 mass % or more, preferably 8 to 30 mass % of polyoxyethylene group, and the polyoxyethylene group has a number average molecular weight of, for example, 200 to 6000, preferably 300 to 3000, even more preferably 400 to 2500.

In the polyoxyethylene chain-containing polyisocyanate, when the polyoxyethylene group has a number average molecular weight of below the above-described lower limit, water dispersibility of the water dispersible polyisocyanate curing agent may be reduced, and when the polyoxyethylene group has a number average molecular weight of more than the above-described upper limit as well, water dispersibility of the water dispersible polyisocyanate curing agent may be reduced.

When two or more polyisocyanates are used in combination (for example, an aliphatic polyisocyanate and/or its derivative and an alicyclic polyisocyanate and/or its derivative are used in combination, etc.), to include a hydrophilic group at a portion of the polyisocyanate, a hydrophilic group is included in each of the polyisocyanates used in combination, and then they are mixed, or the polyisocyanates are blended and then hydrophilic groups are included therein.

Furthermore, the polyisocyanates to be used in combination can be mixed and the mixture is allowed to contain hydrophilic groups to produce a mixture containing hydrophilic groups. Alternatively, polyisocyanates containing hydrophilic groups can be prepared, and they can be mixed.

The mixing ratio of such a water dispersible polyisocyanate curing agent relative to 100 parts by mass of the water-borne resin (solid content of aqueous dispersion) is, for example, 10 to 100 parts by mass, preferably 15 to 70 parts by mass, and the mixing ratio of such a water dispersible polyisocyanate curing agent relative to 100 parts by mass of the swellable inorganic layer compound is, for example, 80 to 500, preferably 100 to 500 parts by mass, more preferably, 100 to 400 parts by mass.

When the mixing ratio of the water dispersible polyisocyanate curing agent is within the above-described range, excellent barrier properties can be ensured.

The laminating adhesive can be prepared, for example, by blending the swellable inorganic layer compound and the water dispersible polyisocyanate curing agent to the aqueous dispersion of the water-borne resin at the above-described ratio, and stirring the mixture for homogeneous dispersion in water.

Furthermore, the laminating adhesive may contain various additives as necessary as long as the additives are contained in the range that does not damage barrier properties. Examples of additives include a silane coupling agent, a stabilizer (antioxidant, heat stabilizer, ultraviolet absorber, etc.), a plasticizer, an antistatic agent, a lubricant, an anti-blocking agent, a coloring agent, a filler, and a crystal nucleating agent.

Furthermore, water may be suitably added to the laminating adhesive to adjust the solid content of the laminating adhesive to, for example, 0.5 to 30 mass %, preferably 1 to 25 mass %. The swellable inorganic layer compound may undergo secondary aggregation in the aqueous dispersion, and therefore preferably, after the swellable inorganic layer compound is dispersed or mixed in a solvent, using a mechanical compulsive dispersion that applies shearing force, for example, by dispersion with a homomixer, a colloid mill, a jet mill, a kneader, a sand mill, a ball mill, a bead mill, a three roll mill, and a ultrasonic dispersion device, the swellable inorganic layer compound is dispersed.

Such a laminating adhesive is prepared from a water-borne resin obtained by allowing an isocyanate group-terminated prepolymer having an anionic group to react with a chain extender, a swellable inorganic layer compound, and a water dispersible polyisocyanate curing agent, and therefore is excellent in barrier properties (gas barrier properties against oxygen and water vapor).

Thus, by applying the obtained laminating adhesive onto one side or both sides of a substrate film, a laminate (composite film) that is excellent in barrier properties can be obtained.

Examples of substrate films include resin films composed of a thermoplastic resin such as polyolefin resin (for example, polyethylene, polypropylene, propylene-ethylene copolymer, etc.), polyester resin (for example, polyethylene terephthalate, etc.), polyamide resin (for example, nylon6, nylon66, etc.), vinyl resin (for example, polyvinyl alcohol, ethylene-vinyl alcohol copolymer, etc.), and cellophane. Preferably, a polyolefin resin film, a polyester resin film, and a polyamide resin film are used.

The substrate film may be a single layer film, or may be a laminate film of resin films. The substrate film may also be a laminate substrate film of a resin film and another substrate film (metals such as aluminum, paper, etc.).

Furthermore, the resin film may be an unstretched film, a uniaxial or a biaxially oriented film, and may be a surface-treated (corona discharge treatment, etc.), an anchor coat or a under coat-treated resin film. The resin film may also be a vapor deposition resin film that is vapor deposited with metals such as aluminum, and metal oxides such as silica, and alumina.

For the substrate film, preferably, a transparent film (to be specific, a resin film not containing metal or metal oxide) is used. With a transparent film, when using an obtained composite film as a packaging material, content of the package can be seen from outside.

The substrate film has a thickness of, for example, 3 to 200 μm, preferably 5 to 120 μm, even more preferably 10 to 100 μm.

The application of the laminating adhesive to the substrate film is not particularly limited, and for example, a known coating method such as gravure coating, reverse coating, roll coating, bar coating, spray coating, air knife coating, and dipping are used. The coating can also be performed by a suitable combination of these.

After applying the laminating adhesive to the substrate film, the applied laminating adhesive is dried to form a coat, and then cured, thereby forming a film. The coating composed of the formed laminating adhesive has a thickness of, for example, about 0.1 to 15 μm, preferably 0.2 to 10 μm, even more preferably 0.5 to 5 μm.

To form the coating, the drying by heating can be performed at, for example, 50 to 200° C., preferably 80 to 150° C., and curing of the coating can be performed by heating and aging at, for example, 25 to 80° C., preferably 35 to 60° C. for 24 hours to 7 days.

The thus obtained laminate (composite film) is excellent in gas barrier properties against oxygen and water vapor, and is effectively used in various fields.

In particular, in such a laminate, the above-described laminating adhesive is used, and therefore even when only a transparent resin film is laminated without using a vapor deposited film in which metals or metal oxides are vapor deposited, excellent gas barrier properties can be ensured, and when such a laminate is used as a packaging material, the content to be packaged can be seen from outside.

That is, in such a laminate, the above-described laminating adhesive is used, and therefore without restriction from materials, materials can be selected widely.

EXAMPLES

In the following, the present invention is described in further detail with reference to Examples and Comparative Examples; however, the present invention is not limited thereto.

Synthesis Example 1

Synthesis of Water-Borne Resin A

To 90.4 g of acetinitrile, 95.4 g of 1,3-bis(isocyanatomethyl)cyclohexane (H$_6$XDI), 61.7 g of 1,3-xylylenediisocyanate (XDI), 27.2 g of ethylene glycol, 1.6 g of glycerin, and 14.4 g of dimethylol propionic acid were mixed, and the mixture was allowed to react in a nitrogen atmosphere at 70° C. for 4 hours, thereby synthesizing a carboxyl group-containing isocyanate group-terminated prepolymer. After a predetermined isocyanate group content was achieved, the mixture was cooled to 40° C., and 10.6 g of triethylamine was added to neutralize the carboxyl group.

Thereafter, the obtained isocyanate group-terminated prepolymer was dispersed in 750 g of water with Homodisper, and 27.6 g of 2-hydroxyethylaminoethylamine was added thereto to cause chain extension reaction. Thereafter, acetinitrile was distilled off, and the solid content was adjusted to be 25 mass %, thereby producing an aqueous dispersion of the water-borne resin. The water-borne resin had an average particle size of 90 nm, and an acid value of 22.9 mgKOH/g.

Synthesis Example 2

Synthesis of Water-Borne Resin B

To 97.5 g of acetinitrile, 49.7 g of 1,3-bis(isocyanatomethyl)cyclohexane (H$_6$XDI), 32.1 g of 1,3-xylylenediisocyanate (XDI), 105.3 g of UH-200 (manufactured by Ube Industries, Ltd., polycarbonatediol, molecular weight 2000), 11.0 g of neopentyl glycol, and 16.9 g of dimethylol propionic acid were mixed, and the mixture was allowed to react in a nitrogen atmosphere at 70° C. for 4 hours, thereby synthesizing a carboxyl group-containing isocyanate group-terminated prepolymer. After a predetermined isocyanate group content was achieved, the mixture was cooled to 40° C., and 12.5 g of triethylamine was added to neutralize the carboxyl group.

Thereafter, the obtained isocyanate group-terminated prepolymer was dispersed in 760 g of water with Homodisper, and 13.8 g of 2-hydroxyethylaminoethylamine was added thereto to cause chain extension reaction. Thereafter, acetinitrile was distilled off, and the solid content was adjusted to be 30 mass %, thereby producing an aqueous dispersion of the water-borne resin. The water-borne resin had an average particle size of 80 nm and an acid value of 29.4 mgKOH/g.

Synthesis Example 3

Synthesis of Water Dispersible Polyisocyanate C

To 406.1 g of TAKENATE D-170HN (manufactured by Mitsui Chemicals, modified hexamethylene diisocyanate), 62.2 g of methoxypolyethylene glycol (manufactured by TOHO Chemical Industry Co., LTD., MeO-PEG400) was mixed, and the mixture was allowed to react at 75° C. for 8 hours, thereby producing water dispersible polyisocyanate C. The water dispersible polyisocyanate had an NCO % of 18.0%.

Synthesis Example 4

Synthesis of Water Dispersible Polyisocyanate D

To 257.6 g of TAKENATE D-127N (manufactured by Mitsui Chemicals, modified 1,3-bis(isocyanatomethyl)cyclohexane, ethyl acetate solution having a solid content concentration of 75 mass %), 193.2 g of TAKENATE D-177N (manufactured by Mitsui Chemicals, modified hexamethylene diisocyanate) and 63.6 g of methoxypolyethylene glycol (manufactured by TOHO Chemical Industry Co., LTD., MeO-PEG400) were mixed, and the mixture was allowed to react at 75° C. for 8 hours. Thereafter, ethyl acetate was removed under reduced pressure, thereby producing water dispersible polyisocyanate D. The water dispersible polyisocyanate had an NCO % of 14.7%.

Synthesis Example 5

Synthesis of Water Dispersible Polyisocyanate E

Water dispersible polyisocyanate C was mixed with water dispersible polyisocyanate D at a mass ratio of 1:1, thereby producing water dispersible polyisocyanate E. The water dispersible polyisocyanate had an NCO % of 16.4%.

Examples 1 to 11, 23 to 27 and Comparative Examples 1 to 6

Water-borne resins A and B, water dispersible polyisocyanates C, D, and E, a carbodiimide curing agent (manufactured by Nisshinbo Holdings Inc., trade name Carbodilite SV-02, solid content 40 parts by mass), an epoxy curing agent (manufactured by Nagase ChemteX Corporation, trade name DENACOL EX-810, solid content 100 parts by mass), synthetic mica (swelling inorganic layer compound, manufactured by Topy Industries Limited, trade name NTS-5, solid content concentration 6 mass %, average particle size 12 μm) were mixed with the mixing formulations shown in Table 1 and Table 2, and water was added to adjust to a solid content concentration of 20 mass %, thereby producing a laminating adhesive.

Examples 12 to 22, 28 to 32 and Comparative Examples 8 to 12

The laminating adhesives of Examples and Comparative Examples were applied with an applicator on corona treated surfaces of biaxially oriented polypropylene film (OPP film, manufactured by TOYOBO CO., LTD., PYLEN P-2161, thickness 20 microns) so that the application amount after drying water was about 3.0 g/m$^2$, and water was evaporated. Thereafter, an unstretched polypropylene film (CPP film, manufactured by TOYOBO CO., LTD., PYLEN P-1128, thickness 20 microns) was bonded thereto immediately, and aged at 40° C. for two days, thereby producing a composite film (laminate).

Comparative Example 13

Composite films (laminate) were obtained in the same manner as in Examples 12 to 22, 28 to 32 and Comparative Examples 8 to 12, except that a polyurethane adhesive mixture (adhesive mixture in which TAKELAC A-969V/TAKENATE A-5 (both manufactured by Mitsui Chemicals) were mixed at a mass ratio of 3/1, and diluted suitably with ethyl acetate) was used instead of the laminating adhesives of Examples and Comparative Examples.

Comparative Examples 14 and 15

The laminating adhesives of Example 1 and Comparative Example 6 were applied with an applicator on the corona treated surfaces of biaxially oriented polypropylene films (OPP film, manufactured by TOYOBO CO., LTD., PYLEN P-2161, thickness 20 microns), so that the application amount after drying water was about 1.0 g/m$^2$ and water was evaporated. Thereafter, the film was cured at 40° C. for two days.

A polyurethane adhesive mixture (adhesive mixture in which TAKELAC A-969V/TAKENATE A-5 (both manufactured by Mitsui Chemicals) were blended at a mass ratio of 3/1, and suitably diluted with ethyl acetate) was applied on the laminating adhesive applied surface of the aged film, so that the application amount after drying the solvent was about 2.5 g/m$^2$. Thereafter, the solvent was dried, and an unstretched polypropylene film (CPP film, manufactured by TOYOBO CO., LTD., PYLEN P-1128, thickness 20 microns) was bonded thereto, and the film was aged at 40° C. for two days.

Evaluation

<Adhesion Strength Test>

Adhesion strength (N/25 mm width) between the biaxially oriented polypropylene film/unstretched polypropylene film of a composite film of a test piece having a width of 25 mm was measured by T-peel test under an environment of 25° C. at a tension speed of 300 mm/min. The results are shown in Table 1 and Table 2.

In Comparative Examples 9 and 13, the OPP films were ruptured.

<Gas Barrier Properties Test>

Oxygen transmittance (mL/m$^2$·atm·Day) of the composite films was measured by using an oxygen transmittance measurement device (OXTRAN2/20, manufactured by MOCON) under an atmosphere of a temperature of 20° C. and a relative humidity of 80%. The results are shown in Tables 1 and 2.

TABLE 1

| Composite film | | Example No. • Comparative Example No. | | | | | | | | | | |
|---|---|---|---|---|---|---|---|---|---|---|---|---|
| | | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
| Laminating adhesive Formulation (parts by mass) | Example No. • Comparative Example No. | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| | Water-borne resin A (25 mass %) | 12 | 12 | 12 | 8 | 8 | — | 12 | 6 | 12 | 12 | 12 |
| | Water-borne resin B (30 mass %) | — | — | — | — | — | 10 | — | — | — | — | — |
| | Water dispersible polyisocyanate C | 0.5 | 1 | 1.5 | 1.33 | 2 | 0.5 | 0.33 | 1.9 | — | — | — |
| | Water dispersible polyisocyanate D | — | — | — | — | — | — | — | — | 0.5 | 1 | 1.5 |
| | Carbodiimide curing agent | — | — | — | — | — | — | — | — | — | — | — |
| | Epoxy curing agent | — | — | — | — | — | — | — | — | — | — | — |
| | Synthetic mica | 6.50 | 7.33 | 8.33 | 5.17 | 7.33 | 6.50 | 6.17 | 6.30 | 8.50 | 7.33 | 8.33 |
| Polyurethane adhesive mixture | | Absent | Absent | Absent | Absent | Absent | Absent | Absent | Absent | Absent | Absent | Absent |
| Evaluation | Adhesion Strength (N/25 mm width) | 0.80 | 0.73 | 0.71 | 0.78 | 0.70 | 1.4 | 0.33 | 0.63 | 0.75 | 0.61 | 0.60 |
| | Oxygen Transmittance (ml/M$^2$ · Atm · Day) | 1.0 | 4.8 | 8.4 | 11.9 | 26 | 164 | 1.4 | 49 | 5.6 | 3.3 | 5.0 |

| Composite film | | Example No. • Comparative Example No. | | | | | | | |
|---|---|---|---|---|---|---|---|---|---|
| | | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
| Laminating adhesive Formulation (parts by mass) | Example No. • Comparative Example No. | Comp. Ex. 1 | Comp. Ex. 2 | Comp. Ex. 3 | Comp. Ex. 4 | Comp. Ex. 5 | — | Comp. Ex.6 | Ex. 1 |
| | Water-borne resin A (25 mass %) | 12 | 12 | 12 | 12 | 12 | — | 12 | 12 |
| | Water-borne resin B (30 mass %) | — | — | — | — | — | — | — | — |
| | Water dispersible polyisocyanate C | — | 0.5 | — | — | — | — | 0.5 | 0.5 |
| | Carbodiimide curing agent | — | — | — | 0.5 | — | — | — | — |
| | Epoxy curing agent | — | — | — | — | 1 | — | — | — |
| | Synthetic mica | — | — | 5.50 | 6.50 | 7.40 | — | 14.6 | 6.50 |

TABLE 1-continued

| Polyurethane adhesive mixture | | Absent | Absent | Absent | Absent | Absent | Present | Present | Present |
|---|---|---|---|---|---|---|---|---|---|
| Evaluation | Adhesion Strength (N/25 mm width) | 0.35 | OPP ruptured | 0.08 | 0.49 | 0.95 | OPP ruptured | 0.29 | 0.45 |
| | Oxygen transmittance (mL/m$^2$ · atm · Day) | 23 | 129 | 1.6 | 1.3 | 33 | * | 2.2 | 25 |

* Measurement was not possible by the device because the value of oxygen transmittance was too large

TABLE 2

| | | Example No. • Comparative Example No. | | | | |
|---|---|---|---|---|---|---|
| Composite film | | Ex. 28 | Ex. 29 | Ex. 30 | Ex. 31 | Ex. 32 |
| Laminating adhesive Formulation (parts by mass) | Example No. • Comparative Example No. | Ex. 23 | Ex. 24 | Ex. 25 | Ex. 26 | Ex. 27 |
| | Water-borne resin A (25 mass %) | 12 | 12 | 8 | 12 | 6 |
| | Water-borne resin B (30 mass %) | — | — | — | — | — |
| | Water dispersible polyisocyanate E | 0.5 | 1.5 | 2 | 0.33 | 1.9 |
| | Carbodiimide curing agent | — | — | — | — | — |
| | Epoxy curing agent | — | — | — | — | — |
| | Synthetic mica | 6.50 | 8.33 | 7.33 | 6.17 | 6.30 |
| Polyurethane adhesive mixture | | Absent | Absent | Absent | Absent | Absent |
| Evaluation | Adhesion Strength (N/25 mm width) | 0.85 | 0.81 | 0.80 | 0.55 | 0.73 |
| | Oxygen transmittance (mL/m$^2$ · atm · Day) | 0.7 | 5.8 | 18 | 0.95 | 34 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

A laminating adhesive of the present invention is used for producing a laminate such as a composite film. A laminate of the present invention can be used, for example, as a packaging material for various industrial fields.

The invention claimed is:

1. A laminating adhesive prepared from
   a water-borne resin obtained by allowing an isocyanate group-terminated prepolymer having an anionic group to react with a chain extender,
   a swellable inorganic layer compound, and
   a water dispersible polyisocyanate curing agent,
   wherein the water dispersible polyisocyanate curing agent includes, as a polyisocyanate component, an aliphatic polyisocyanate derivative and an alicyclic polyisocyanate derivative, and the aliphatic polyisocyanate derivative is 150 parts by mass or more and 600 parts by mass or less relative to 100 parts by mass of the alicyclic polyisocyanate derivative.

2. The laminating adhesive according to claim 1, wherein 100 to 500 parts by mass of the water dispersible polyisocyanate curing agent is blended relative to 100 parts by mass of the swellable inorganic layer compound.

3. The laminating adhesive according to claim 1, wherein the isocyanate group-terminated prepolymer is obtained by allowing
   a polyisocyanate of at least one selected from the group consisting of an aromatic polyisocyanate, an aralkyl polyisocyanate, and an alicyclic polyisocyanate to react with
   a polyol having 2 to 8 carbon atoms, and
   an anionic group-containing polyol having 3 to 6 carbon atoms.

4. A laminate obtained by using the laminating adhesive according to claim 1.

* * * * *